US009433267B1

(12) United States Patent
Browne et al.

(10) Patent No.: US 9,433,267 B1
(45) Date of Patent: Sep. 6, 2016

(54) JEWELRY PROCESS

(71) Applicant: Levitation Jewelry LLC, Champaign, IL (US)

(72) Inventors: Neil Browne, Champaign, IL (US); Dalal Browne, Savoy, IL (US); William F. Longfellow, Champaign, IL (US)

(73) Assignee: Levitation Jewelry LLC, Champaign, IL (US)

( * ) Notice: Subject to any disclaimer, the term of this patent is extended or adjusted under 35 U.S.C. 154(b) by 248 days.

(21) Appl. No.: 14/457,967

(22) Filed: Aug. 12, 2014

Related U.S. Application Data

(63) Continuation-in-part of application No. 13/066,264, filed on Apr. 11, 2011, now abandoned.

(60) Provisional application No. 61/342,358, filed on Apr. 13, 2010.

(51) Int. Cl.
*A44C 27/00* (2006.01)
*B29C 45/14* (2006.01)
*B29C 39/10* (2006.01)
*B29K 75/00* (2006.01)
*B29K 705/08* (2006.01)
*B29L 31/00* (2006.01)

(52) U.S. Cl.
CPC ............ *A44C 27/00* (2013.01); *B29C 39/10* (2013.01); *B29C 45/14688* (2013.01); *B29C 45/14819* (2013.01); *B29K 2075/00* (2013.01); *B29K 2705/08* (2013.01); *B29K 2995/0026* (2013.01); *B29K 2995/0031* (2013.01); *B29L 2031/743* (2013.01)

(58) Field of Classification Search
CPC ....... A44C 27/00; B29C 39/10; B29C 39/02; B29C 39/021; B29C 39/023; B29C 39/025; B29C 39/12; B29C 39/123; B29C 39/126; B29C 45/14688; B29C 45/14; B29C 45/14008; B29C 45/14147; B29C 45/14221; B29C 45/14819; B29K 2075/00; B29K 2995/0026; B29K 2995/0031; B29L 2031/743; B29L 2031/7432; B44C 5/005
See application file for complete search history.

(56) References Cited

U.S. PATENT DOCUMENTS 2,350,421 A * 6/1944 Schoder ................. B29C 43/18
264/255
2,451,913 A * 10/1948 Brice ....................... A44C 1/00
40/1.5

(Continued)

Primary Examiner — Jacob Cigna
(74) Attorney, Agent, or Firm — Singleton Law Firm, P.C.

(57) ABSTRACT

Embodiments of the present invention combine an open-face molding process and an injection molding process to embed decorative articles within a shaped unitary body. Two half-molds are formed, each serving both as an open-face mold alone and as components of a two-part mold in combination. An open-face molding process is performed in iterations using each half-mold, wherein during each iteration a layer of a fluid thermoset is poured into each half-mold and allowed to harden into a solid body; pits are bored into each solid body and decorative objects deposited therein; and each pit is plugged with additional quantities of fluid thermoset. Subsequent iterations may be performed over already-formed layers within each half mold. Finally, the half-molds are closed together and joined by an injection molding process, forming a unitary body having a plurality of decorative objects embedded therein.

5 Claims, 16 Drawing Sheets

(56) References Cited

U.S. PATENT DOCUMENTS

| | | | | |
|---|---|---|---|---|
| 3,312,197 A * | 4/1967 | Smith | B43M 9/00 | 206/575 |
| 4,116,439 A * | 9/1978 | Chavarria | A63B 37/00 | 264/245 |
| 4,182,737 A * | 1/1980 | Haber | A63B 37/00 | 264/132 |
| 4,330,578 A * | 5/1982 | Nishihira | A44B 15/005 | 428/13 |
| 4,353,850 A * | 10/1982 | MacDonald | A63B 37/0001 | 264/138 |
| 4,396,192 A * | 8/1983 | Fitzpatrick | A63B 37/00 | 264/275 |
| 4,809,417 A * | 3/1989 | Normann, Jr. | A44C 17/003 | 156/60 |
| 5,098,096 A * | 3/1992 | Gentiluomo | A63B 37/0001 | 273/DIG. 20 |
| 5,672,089 A * | 9/1997 | Piera Bermejo | A63B 37/00 | 40/327 |
| 6,060,011 A * | 5/2000 | Zandvliet | B44C 5/005 | 264/271.1 |
| 6,217,806 B1 * | 4/2001 | Baxley | B29C 39/021 | 264/161 |
| 6,592,706 B1 * | 7/2003 | Malherbe de Juvigny | B44C 5/005 | 156/292 |
| 6,948,695 B1 * | 9/2005 | Clark | B29C 33/3814 | 249/114.1 |
| 7,374,469 B2 * | 5/2008 | Lin | B29C 41/04 | 264/271.1 |

* cited by examiner

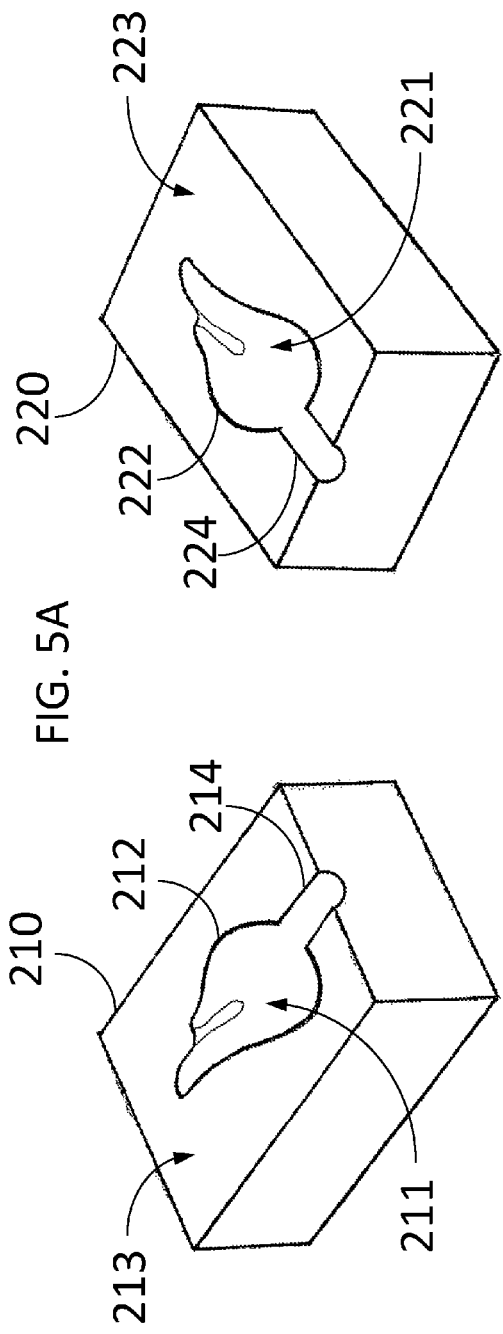
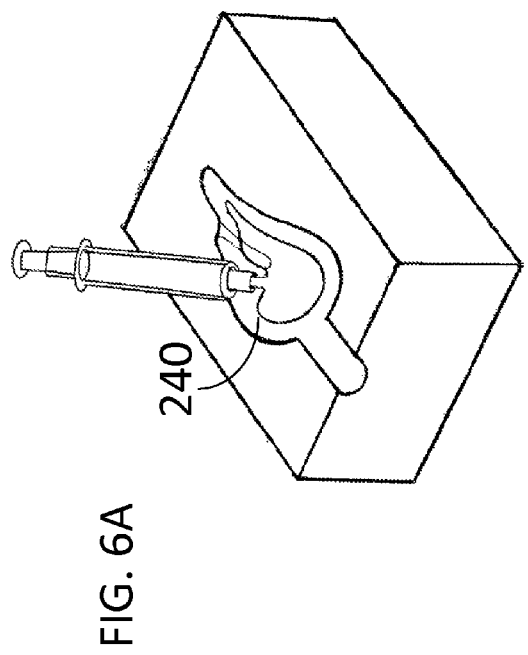
FIG. 5A
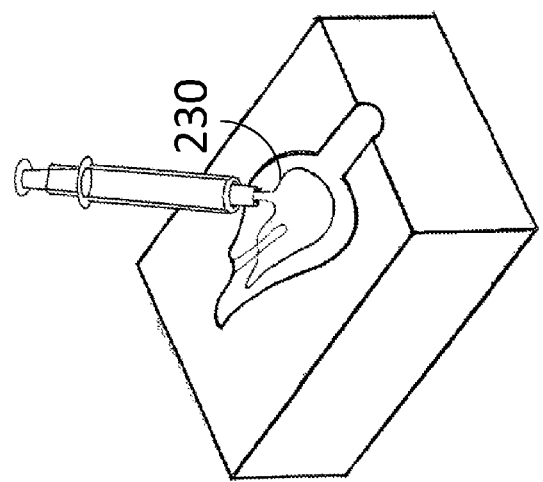
FIG. 6A

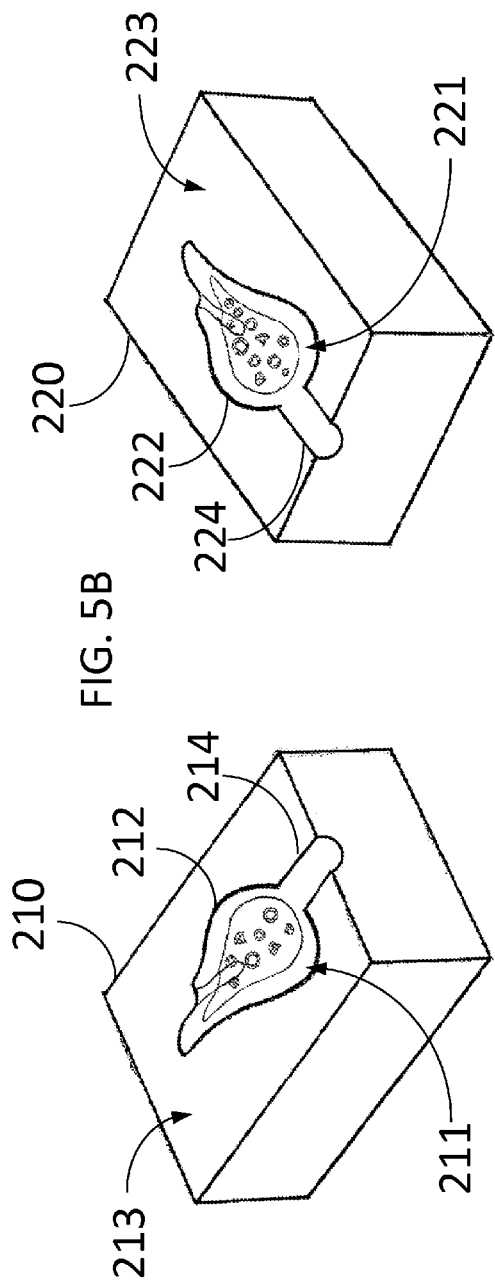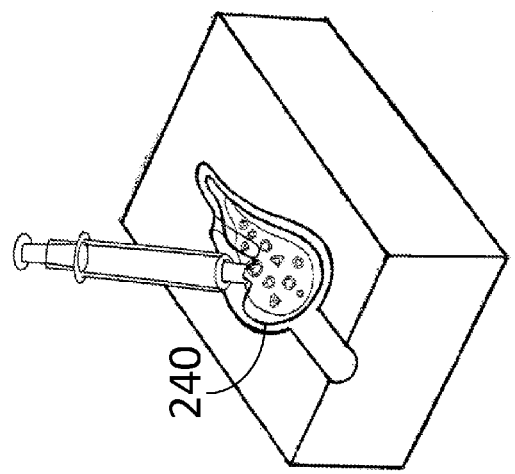

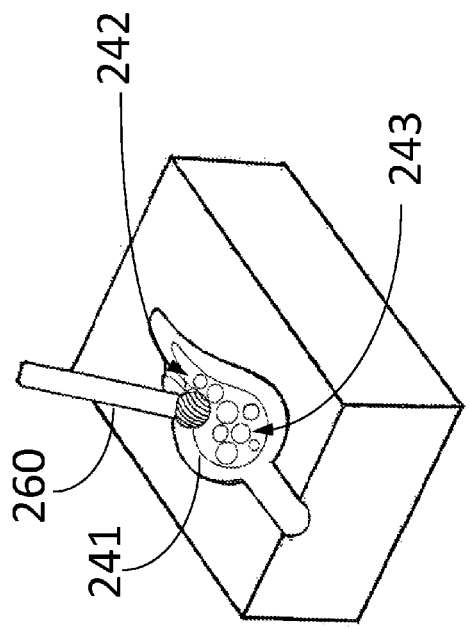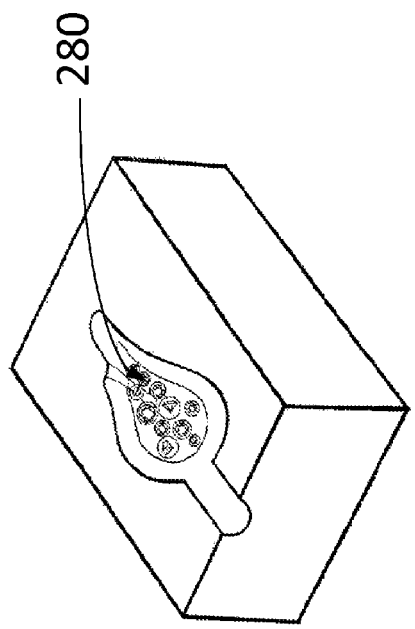
FIG. 7A
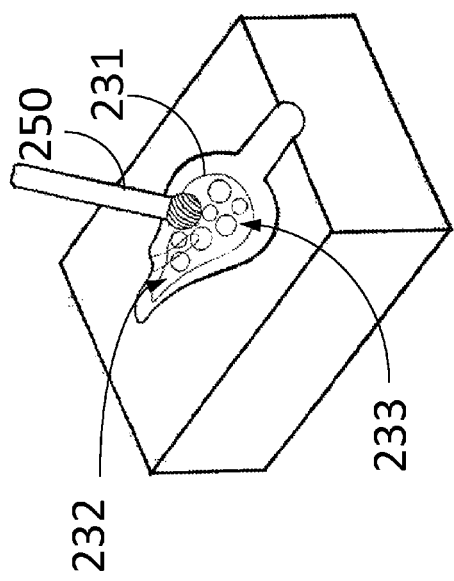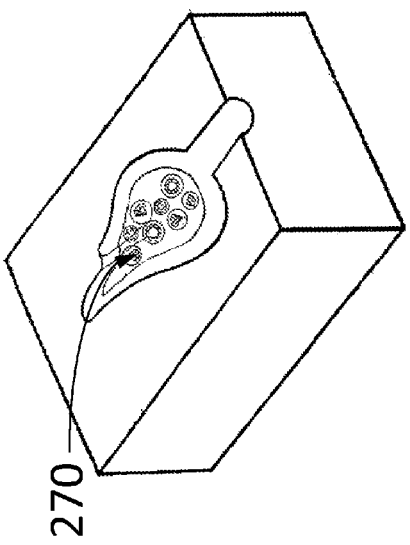
FIG. 8A

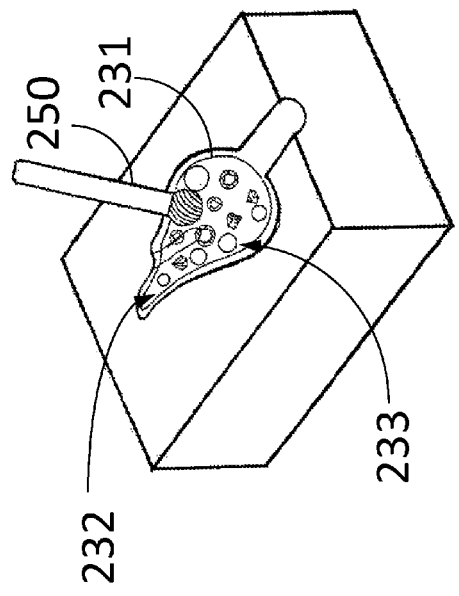
FIG. 7B
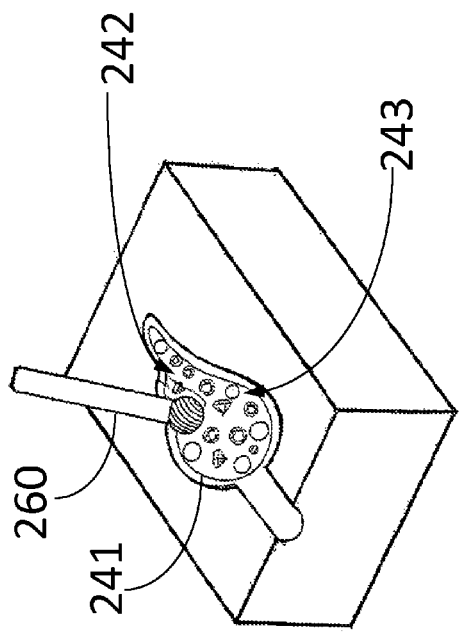
FIG. 8B
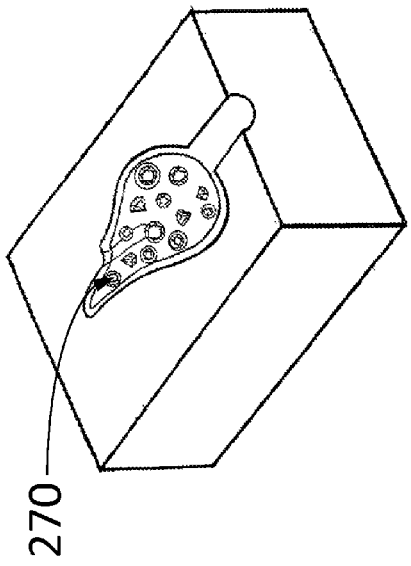
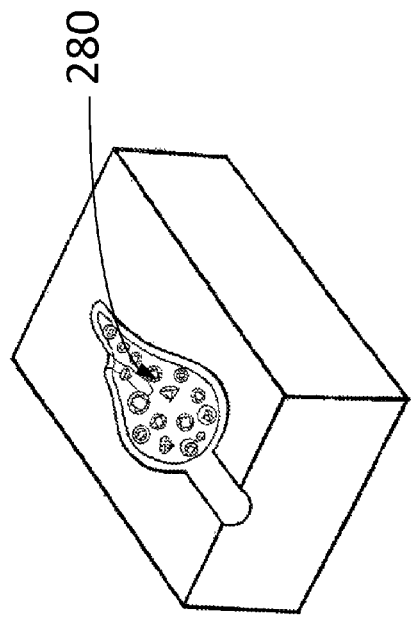

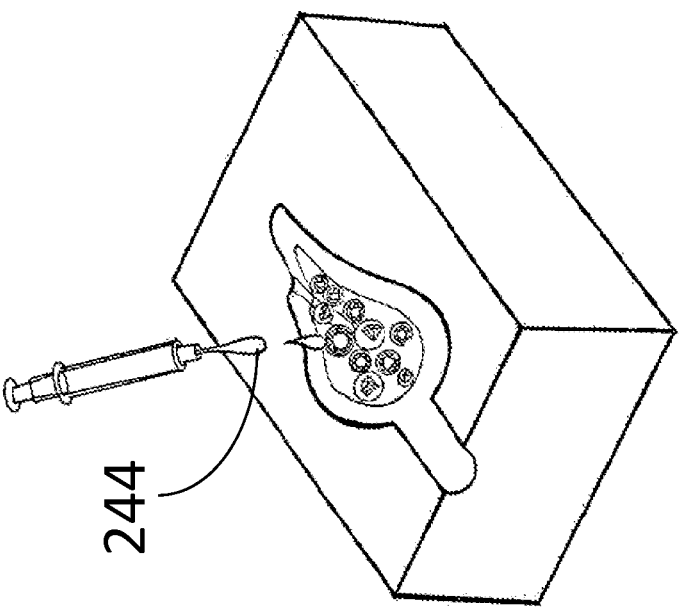
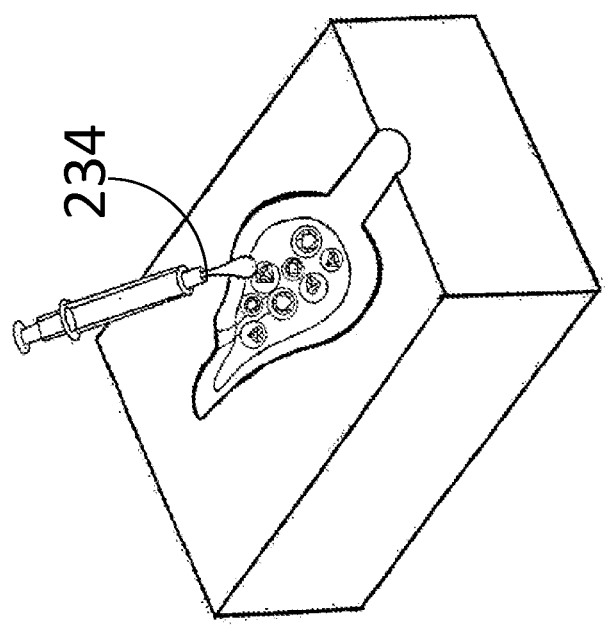
FIG. 9A

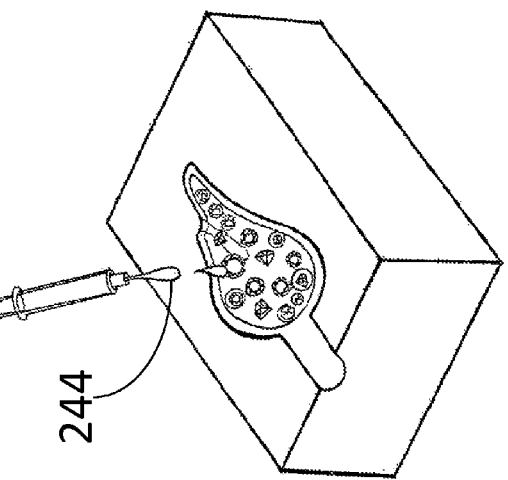
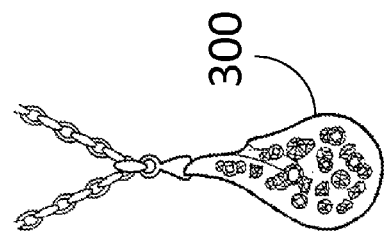
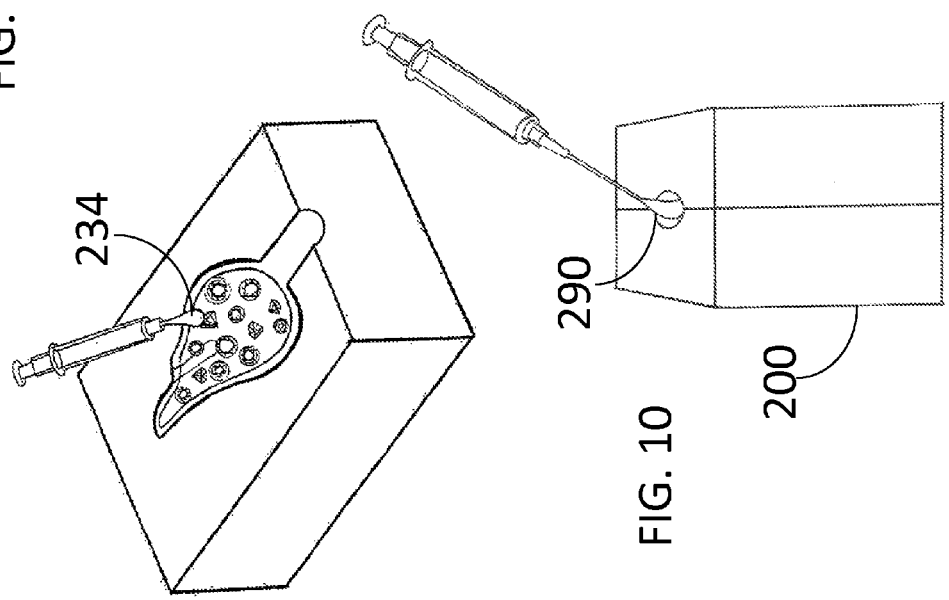

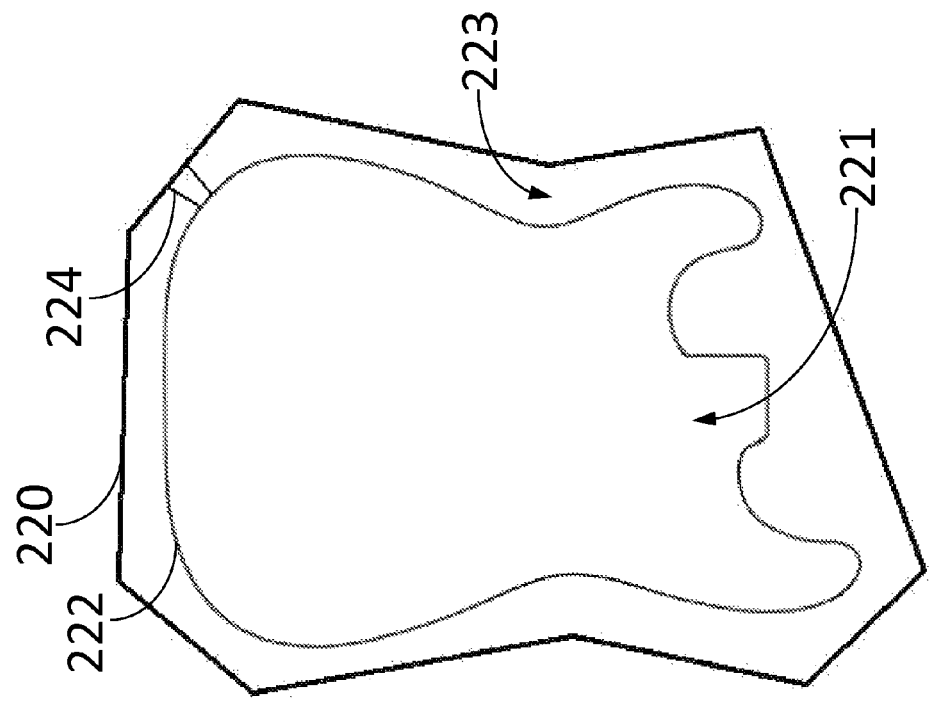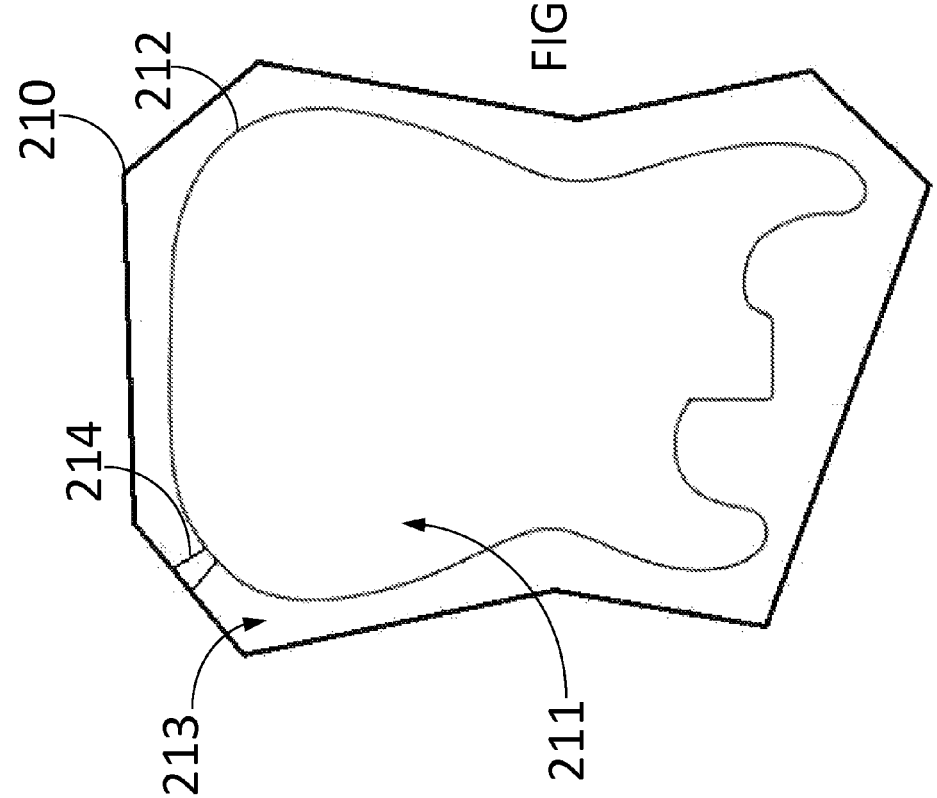
FIG. 13

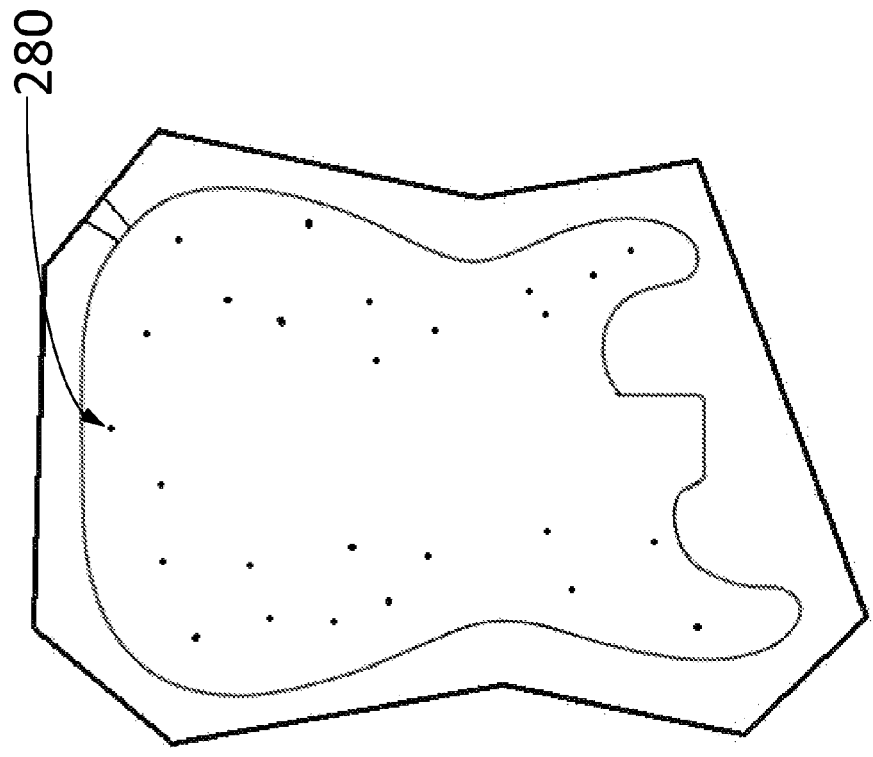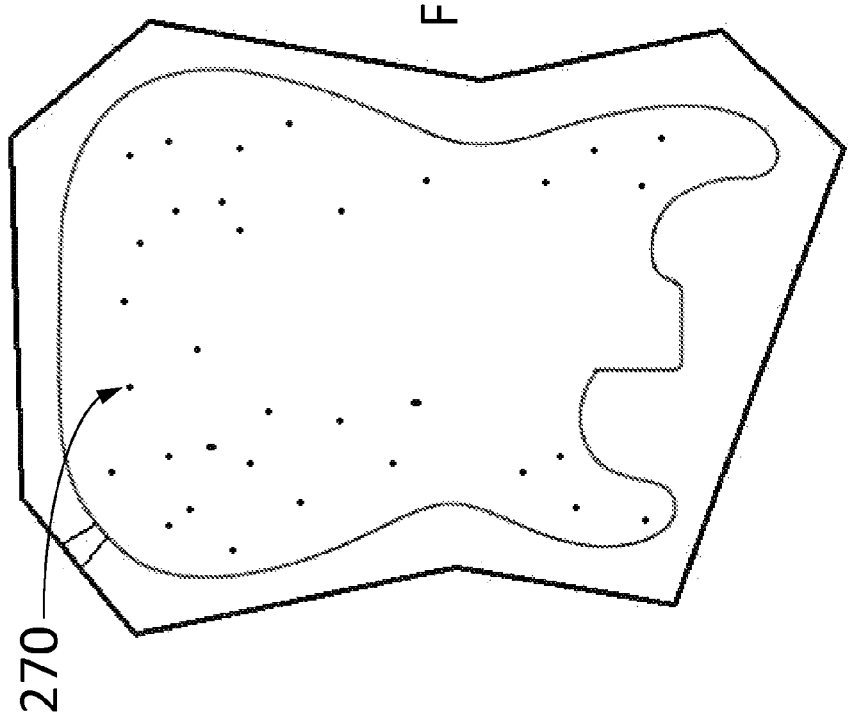
FIG. 15

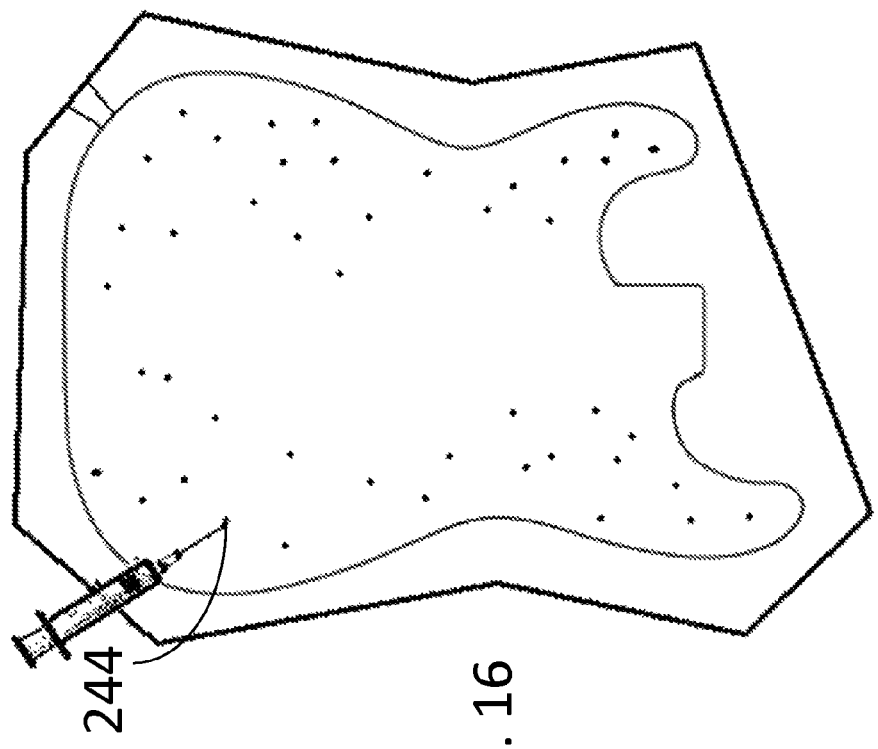
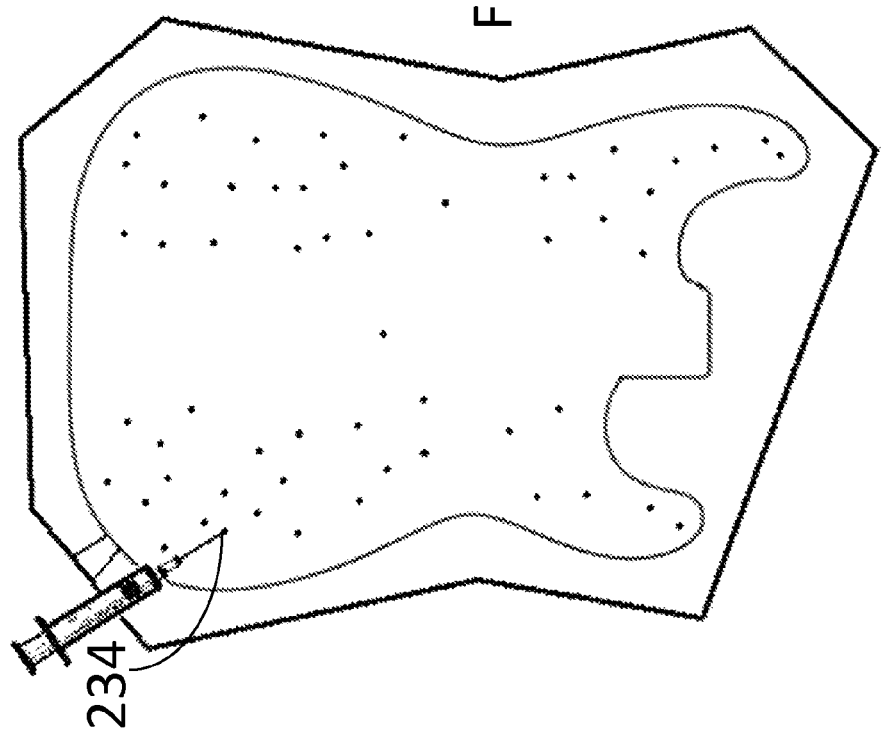
FIG. 16

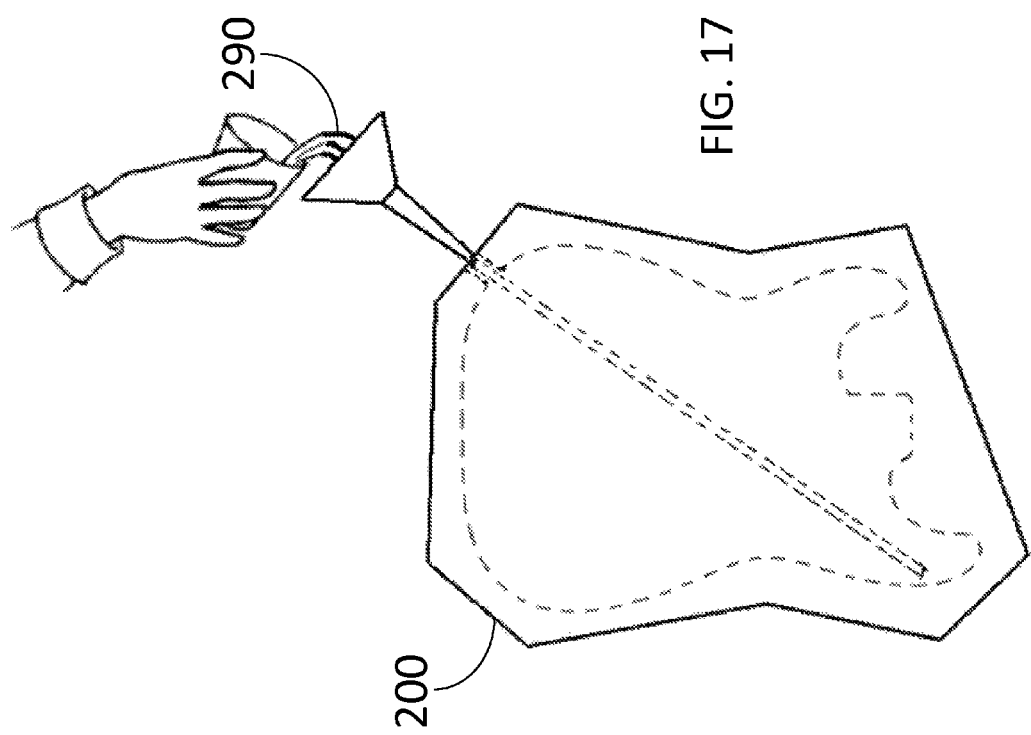

JEWELRY PROCESS

CROSS-REFERENCE TO RELATED APPLICATIONS

The present application is a continuation-in-part of U.S. patent application Ser. No. 13/066,264, filed Apr. 11, 2011, which claims the benefit of U.S. Provisional Patent Application No. 61/342,358, filed Apr. 13, 2010. Each above-mentioned patent application is hereby incorporated by reference in its entirety.

BACKGROUND OF THE INVENTION

The present invention generally relates to jewelry manufacturing processes. More particularly, the present invention relates to a process of embedding articles within a shaped plastic form.

Jewelry has been made of many different metals, gems, and other materials since prehistoric times. Within the past century, many types of polymeric elastomers have been developed. Many of these elastomers have been used in jewelry, including thermosets. Thermosets are elastomeric materials that are fluid (liquid or malleable) prior to curing and are adapted for pouring into molds. Thermosets cure (harden) over time as a polymeric reaction occurs, often with the application of heat and/or pressure. The polymeric reaction often occurs in the presence of a catalyst (sometimes referred to as an initiator). Some thermosets are clear (transparent) after curing.

A variety of articles have been made by embedding decorative items in molded bodies. For example, Zandvliet et al., U.S. Pat. No. 6,060,011, describes a method for enclosing an object with a spherical, transparent encapsulation of material. To produce such items, two hemispherical objects are formed having internal cavities. A ceramic object is placed in the cavity of one of the hemispherical objects and a mass of liquid plastic is introduced to fill the cavity and partially immerse the ceramic object. Another mass of liquid plastic is then introduced to fill the cavity of the other hemispherical object. The ceramic object is then pressed into the liquid plastic in the cavity of the other hemispherical object while the two hemispherical objects are united to form a spherical shape.

BRIEF SUMMARY OF THE INVENTION

Embodiments of the present invention provide a process for embedding decorative articles within a shaped unitary body by a hybrid open-face molding and injection molding process. According to embodiments of the present invention, a first half-mold and a second half-mold are formed, having, respectively, a first shaped cavity and a second shaped cavity therein. Each half-mold may function both as an open-faced mold while placed upright alone, and as a component of a two-part mold when the first half-mold and the second half-mold are joined to form a common cavity.

Each half-mold is used in performing at least one iteration of a pour sequence. A quantity of a fluid thermoset is poured into each half-mold and allowed to harden into a solid body. Pits are bored into each solid body, and decorative objects are deposited therein. The locations of pits and deposition sites of the decorative objects, and the orientations of the decorative objects, may be in accordance with a designed pattern, or may be random. Additional plugging quantities of the fluid thermoset are introduced into the pits, submerging each decorative object and plugging each pit. The plugging quantities of the fluid thermoset are allowed to harden. A solid body formed from hardened thermoset, having objects embedded within, is thus formed in each shaped cavity.

Subsequent performances of the pour sequence may add further layers of fluid thermoset over the already-formed solid bodies, and thus add to the sum total of hardened thermoset with further layers having further objects embedded therein. Regardless of the number of performances of the pour sequence using either half-mold, neither shaped cavity is fully filled.

After all iterations of the pour sequences have been performed, the half-molds are united, and a sealing quantity of the fluid thermoset is injected into the common cavity and allowed to harden, joining all quantities of hardened thermoset within the common cavity to form a unitary body having a plurality of decorative objects embedded therein. The shape and appearance of the unitary body may be designed for a variety of jewelry items or elements thereof, or larger functional or ornamental objects.

BRIEF DESCRIPTION OF THE DRAWINGS

FIGS. 5A and 5B illustrate perspective views of a first half-mold and a second half-mold of a two-part mold at the start of earlier performances of pour sequences and later performances of pour sequences, respectively, according to an embodiment of the present invention.

FIGS. 6A and 6B illustrate perspective views of the first half-mold and the second half-mold of FIGS. 5A and 5B during earlier performances of pour steps and later performances of pour steps, respectively, according to an embodiment of the present invention.

FIGS. 7A and 7B illustrate perspective views of the first half-mold and the second half-mold of FIGS. 5A and 5B during earlier performances of bore steps and later performances of bore steps, respectively, according to an embodiment of the present invention.

FIGS. 8A and 8B illustrate perspective views of the first half-mold and the second half-mold of FIGS. 5A and 5B subsequent to earlier performances of deposition steps and later performances of deposition steps, respectively, according to an embodiment of the present invention.

FIGS. 9A and 9B illustrate perspective views of the first half-mold and the second half-mold of FIGS. 5A and 5B during earlier performances of plug steps and later performances of plug steps, respectively, according to an embodiment of the present invention.

FIG. 10 illustrates a perspective view of the first half-mold and the second half-mold of FIGS. 5A and 5B closed together during a joint mold step according to an embodiment of the present invention.

FIG. 11 illustrates an elevation view of a unitary body formed after a joint mold step according to an embodiment of the present invention.

FIG. 13 illustrates perspective views of a first half-mold and a second half-mold of a two-part mold at the start of a performance of pour sequences according to a large-volume embodiment of the present invention.

FIG. 15 illustrates perspective views of the first half-mold and the second half-mold of FIG. 12 during performances of deposition steps according to a large-volume embodiment of the present invention.

FIG. 16 illustrates perspective views of the first half-mold and the second half-mold of FIG. 12 during performances of plug steps according to a large-volume embodiment of the present invention.

FIG. 17 illustrates a cross sectional view of the first half-mold and the second half-mold of FIG. 12 closed together during a joint mold step through the seam plane where the first mold face and the second mold face are closed together, according to a large-volume embodiment of the present invention.

DETAILED DESCRIPTION OF THE INVENTION

Figure 1:
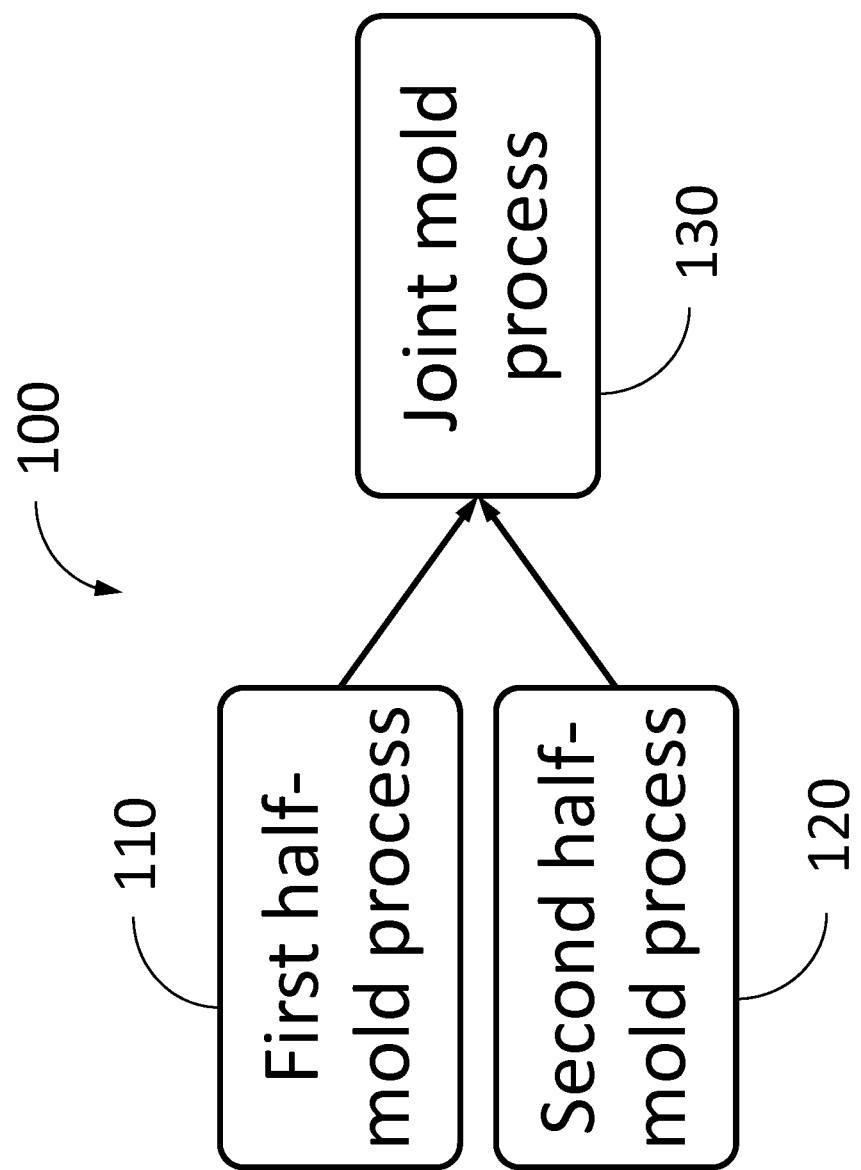
FIG. 1 illustrates a flow chart of a process according to an embodiment of the present invention.

Embodiments of the present invention provide a process for embedding decorative articles within a shaped unitary body by a hybrid open-face molding and injection molding process. A flow chart of a process 100 according to an embodiment of the present invention is illustrated in FIG. 1. The process 100 includes a first half-mold process 110, a second half-mold process 120, and a joint mold process 130.

Figure 2:
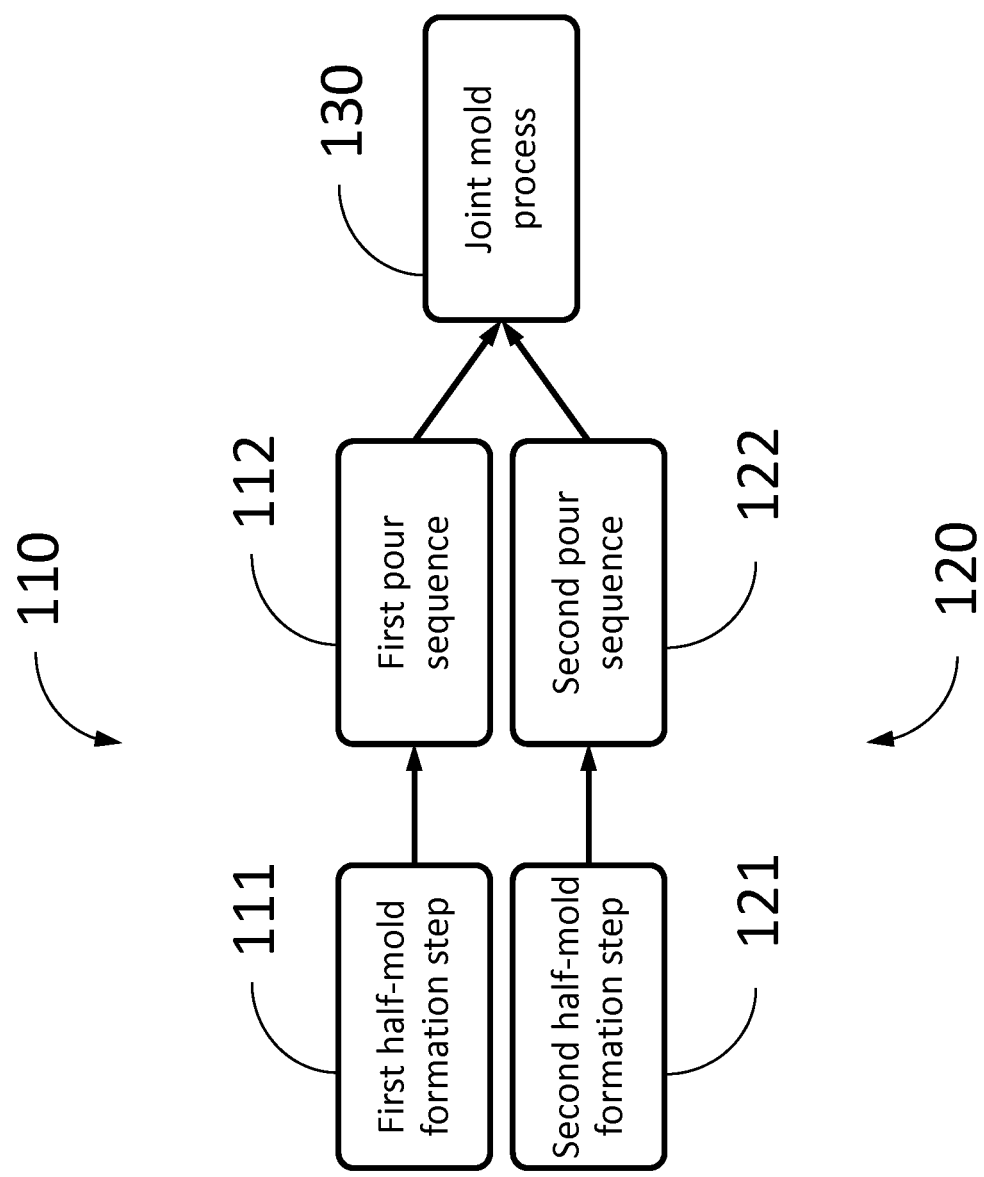
FIG. 2 illustrates a flow chart of detailed steps of a first half-mold process and a second half-mold process according to an embodiment of the present invention.

FIG. 2 illustrates a flow chart of the detailed steps of the first half-mold process 110 and the second half-mold process 120. The first half-mold process 110 includes a first half-mold formation step 111, and a first pour sequence 112 which includes a plurality of steps. The second half-mold process 120 includes a second half-mold formation step 121, and a second pour sequence 122 which includes a plurality of steps. The steps of the first pour sequence 112 are performed at least once, and the steps of the second pour sequence 122 are performed at least once.

Any of the steps of the first half-mold process 110 and any of the steps of the second half-mold process 120 may be performed synchronously or asynchronously relative to each other, without regard as to the relative ordering between any steps of the first half-mold process 110 and any steps of the second half-mold process 120. The joint mold process 130 is performed following both the completion of the first half-mold process 110 and the completion of the second half-mold process 120.

At the first half-mold formation step 111, a first half-mold is formed. At the second half-mold formation step 121, a second half-mold is formed. Both the first half-mold and the second half-mold may be formed from silicone. According to embodiments of the present invention, the silicone is degassed within a vacuum chamber by a vacuum degassing process as known by persons of ordinary skill in the art.

Both the first half-mold and the second half-mold are formed under the application of a pressure substantially higher than atmospheric pressure at sea level (henceforth a "curing pressure"), such as, for example, by forming both the first half-mold and the second half-mold within a pressure vessel maintained at the curing pressure. Throughout all steps of the process 100 according to an embodiment of the present invention, the curing pressure has a substantially constant value wherever a step refers to "the curing pressure." In accordance with an embodiment of the present invention, the curing pressure may have a value of approximately 80 psi.

Both the first half-mold and the second half-mold may be molded about a shaped body to mold shaped cavities in the first half-mold and the second half-mold in substantial conformity with the geometric form of the shaped body. The first half-mold is formed having a first shaped cavity in a first mold face, where the first shaped cavity substantially conforms to a first portion of the geometric form of the shaped body. The second half-mold is formed having a second shaped cavity in a second mold face, where the second shaped cavity substantially conforms to a second portion of the geometric form of the shaped body. According to embodiments of the present invention, the shaped body may be a body having faceted faces, and a first shaped cavity and a second shaped cavity may both be molded to form faceted cavity walls in accordance with the faceted faces of the shaped body. The first half-mold and the second half-mold may be closed together, uniting the first shaped cavity and the second shaped cavity. The first shaped cavity and the second shaped cavity, in union, define a common cavity.

The volume and geometric form of the shaped body may be designed to define the volume and geometric form of a unitary body to be formed as a product of the process 100. The volume and geometric form of the unitary body may be designed to form items of jewelry or elements thereof, such as a pendant or an element thereof, a bracelet or an element thereof, an element of a ring for stonesetting, an element of a necklace such as a bead, or other bodies known for use in jewelry processes. Alternately, the size and geometric form of the unitary body may be designed to form larger functional or ornamental objects, such as shoe heels, guitars, automotive accessories, sculptures, or home decor. According to embodiments of the present invention, an upper limit for the volume of a unitary body that may be formed as a product of the process 100 is approximately 12 cubic feet.

According to embodiments of the present invention, the shaped body may be formed from any substantially rigid-walled material, without limitation. For example, the shaped body may be a wax body. According to further embodiments of the present invention, the shaped body may be formed from a non-clay material. The flexibility of the silicone may determine the extent of conformity of the first shaped cavity and the second shaped cavity to the geometric form of the shaped body. Increased geometrical complexity of the shaped body may require increased flexibility of the silicone to allow substantial conformity to the geometric form of the shaped body. According to embodiments of the present invention, the silicone has a flexibility as defined by a Shore value of Shore A—60.

The first shaped cavity opens at a first brim on the first mold face, and the second shaped cavity opens at a second brim on the second mold face. A first brim plane is defined as a plane substantially overlapping with the first brim and the first mold face, and a second brim plane is defined as a plane substantially overlapping with the second brim and the second mold face.

The first half-mold and the second half-mold may function in conjunction as two components of a two-part mold, such that the first mold face and the second mold face are closeable together at a seam plane. In accordance with known methods of making a two-part mold, a first sprue channel may be formed leading from the first brim to an edge of the first mold face, and a second sprue channel may be formed leading from the second brim to an edge of the second mold face, such that when the first mold face and the second mold face are closed together, the first sprue channel and the second sprue channel are united to form a sprue which accesses the common cavity. Throughout this description, while the first half-mold and the second half-mold are closed together, the first half-mold and the second half-mold are described as positioned in an upright orientation where the sprue which accesses the common cavity is oriented opening substantially upward. While the first half-mold and the second half-mold are closed together, positional terms such as "top" and "bottom" refer to the first half-mold, the second half-mold, and the common cavity in this upright orientation.

Additionally, the first half-mold and the second half-mold may each function as an open-face mold, such that both the first half-mold and the second half-mold may be set in upright positions. Throughout this description, except while the first half-mold and the second half-mold are closed together, the first half-mold and the second half-mold are described as resting in upright orientations where the first mold face of the first half-mold faces upwards and is substantially level, and the second mold face of the second half-mold faces upwards and is substantially level. Except while the first half-mold and the second half-mold are closed together, positional terms such as "top," "bottom," "upper" and "lower" refer to the first half-mold and the second half-mold in these upright orientations. The "depth" of the first shaped cavity and the "depth" of the second shaped cavity refer, respectively, to the vertical depth of each shaped cavity when the first half-mold and the second half-mold are in these upright orientations.

A first set of objects, each having a geometric form, is identified for depositing each at a deposition location throughout the space bounded by the first shaped cavity and the first brim plane, and a second set of objects, each having a geometric form, is identified for depositing each at a deposition location throughout the space bounded by the second shaped cavity and the second brim plane. Any, some, or all of the objects of the first set of objects and any, some, or all of the objects of the second set of objects may be uniform, similar, or dissimilar in shape, in composition, and in color. According to embodiments of the present invention, the objects of the first set of objects and the objects of the second set of objects may be natural or synthetic gemstones. According to an embodiment of the present invention, the objects of the first set of objects and the objects of the second set of objects may be cut cubic zirconia gems.

According to embodiments of the present invention, the number of objects of the first set of objects, the number of objects of the second set of objects, the colors of the first set of objects, the colors of the second set of objects, the sizes of the objects of the first set of objects, and the sizes of the objects of the second set of objects may each be varied without limitation.

Within the first shaped cavity, a first plurality of deposition sites is defined within the space bounded by the first brim plane. Within the second shaped cavity, a second plurality of deposition sites is defined within the space bounded by the second brim plane. A deposition site may be a space at a location within the first shaped cavity, entirely contained within the first shaped cavity and not tangential to the walls of the first shaped cavity and not tangential to the first brim plane, or may be a space at a location within the second shaped cavity, entirely contained within the second shaped cavity and not tangential to the walls of the second shaped cavity and not tangential to the second brim plane.

Each deposition site of the first plurality of deposition sites corresponds in location to the deposition location of one object among the first set of objects and occupies a space substantially similar in size to that object. Each deposition site of the second plurality of deposition sites corresponds in location to the deposition location of one object among the second set of objects and occupies a space substantially similar in size to that object. According to embodiments of the present invention, the locations of the first plurality of deposition sites and/or the locations of the second plurality of deposition sites may form a designed pattern throughout the first shaped cavity and/or the second shaped cavity, respectively, where the designed pattern may represent an icon, a letter, a symbol, or other patterns having semantic or pictorial significance. Alternately, according to embodiments of the present invention, the locations of the first plurality of deposition sites and/or the locations of the second plurality of deposition sites may be random throughout the first shaped cavity and/or the second shaped cavity, respectively.

Embodiments of the present invention may provide that at least two of the deposition sites of the first plurality of the deposition sites are located at different depths within the first shaped cavity. Embodiments of the present invention may provide that at least two of the deposition sites of the second plurality of the deposition sites are located at different depths within the second shaped cavity. Embodiments of the present invention may further provide that at least two deposition sites located at different depths within the first shaped cavity are vertically aligned relative to the depth of the first shaped cavity. Embodiments of the present invention may further provide that at least two deposition sites located at different depths within the second shaped cavity are vertically aligned relative to the depth of the second shaped cavity. Embodiments of the present invention may provide that none of the deposition sites of the first plurality of deposition sites overlap with each other or are tangential to each other, and that none of the deposition sites of the second plurality of deposition sites overlap with each other or are tangential to each other.

At least one fill plane is defined through the first shaped cavity and at least one fill plane is defined through the second shaped cavity. Each fill plane through the first shaped cavity may be defined such that it is substantially parallel to the first brim plane, such that, within the first shaped cavity, it intersects neither with the first brim plane nor with any other fill plane. Each fill plane through the second shaped cavity may be defined such that it is substantially parallel to the second brim plane, such that, within the second shaped cavity, it intersects neither with the second brim plane nor with any other fill plane. The fill planes of the first shaped cavity and the fill planes of the second shaped cavity may or may not be equal in number.

Figure 12:
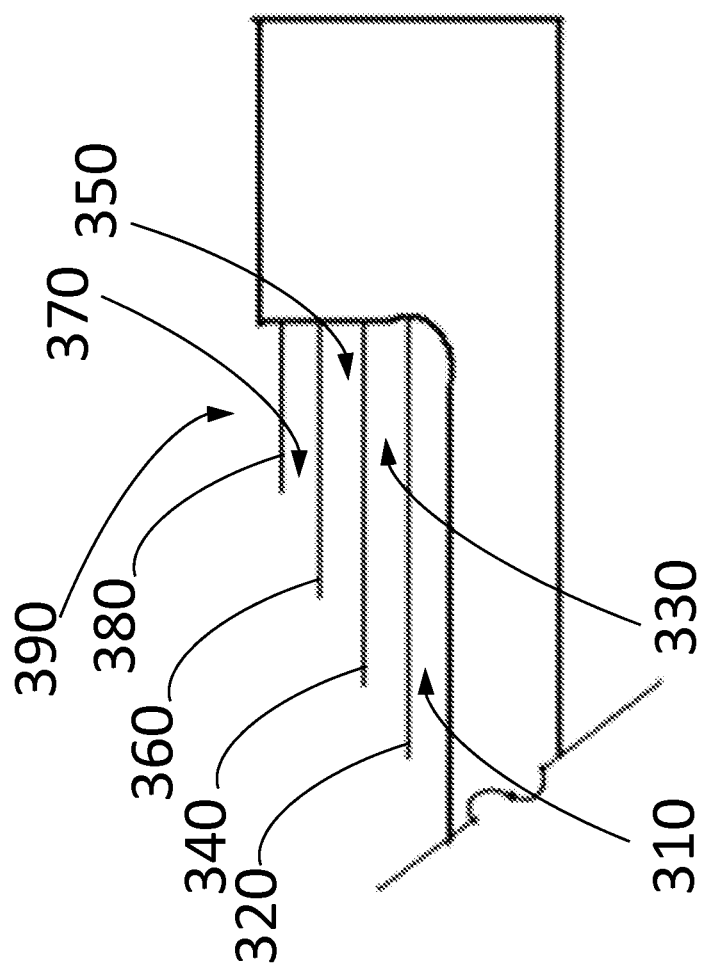
FIG. 12 illustrates a partial cross sectional view of a first shaped cavity divided by a plurality of fill planes according to an embodiment of the present invention.

The fill planes of the first shaped cavity divide the first shaped cavity into a number of cavity divisions, including at least a bottommost cavity division and a topmost cavity division, numbering one more than the number of fill planes defined through the first shaped cavity. Likewise, the fill planes of the second shaped cavity divide the second shaped cavity into a number of cavity divisions, including at least a bottommost cavity division and a topmost cavity division, numbering one more than the number of fill planes defined through the second shaped cavity. For example, FIG. 12 illustrates a partial cross sectional view of a plurality of fill planes defined through a first shaped cavity or a second shaped cavity, according to an embodiment of the present invention. As shown in FIG. 12, when four planes are defined through the first shaped cavity or the second shaped cavity, that shaped cavity is divided into five cavity divisions: a bottommost cavity division 310, defined by the space between the walls of the shaped cavity and the bottom fill plane 320; a lower midsection cavity division 330, defined by the space between the bottom fill plane 320, the lower midsection fill plane 340, and the walls of the shaped cavity; an middle midsection cavity division 350, defined by the space between the lower midsection fill plane 340, the upper midsection fill plane 360, and the walls of the shaped cavity; an upper midsection cavity division 370, defined by the space between the upper midsection fill plane 360, the top fill plane 380, and the walls of the shaped cavity; and a topmost cavity division 390, defined by the space between the top fill plane 380, the first brim plane, and the walls of the shaped cavity.

According to embodiments of the present invention, the top fill plane is defined at approximately 80% of the depth of the first shaped cavity or the second shaped cavity, as measured from the bottom of the first shaped cavity or the second shaped cavity.

Furthermore, the fill planes of the first shaped cavity are defined such that each cavity division of the first shaped cavity, except the topmost cavity division, contains at least one deposition site of the first plurality of deposition sites. Likewise, the fill planes of the second shaped cavity are defined such that each cavity division of the second shaped cavity, except the topmost cavity division, contains at least one deposition site of the second plurality of deposition sites.

Figure 3:
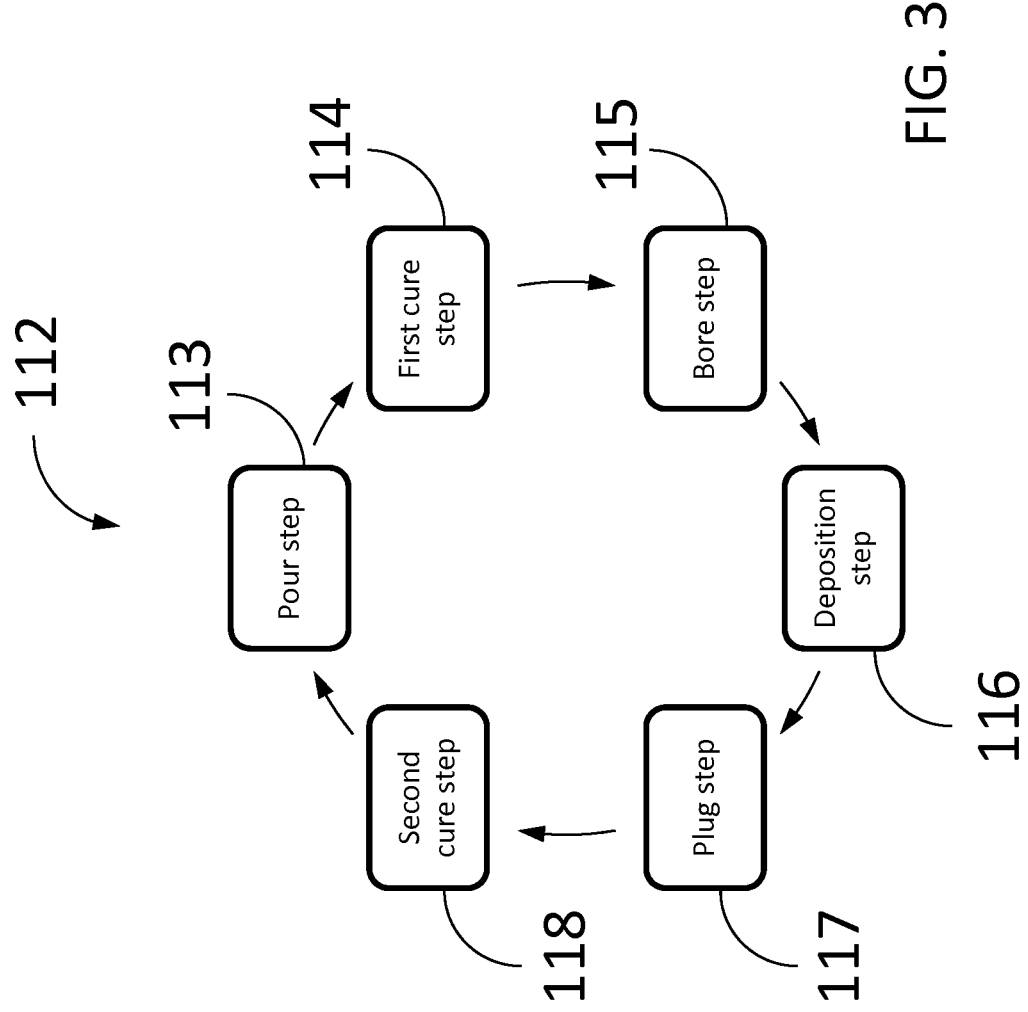
FIG. 3 illustrates a flow chart of detailed steps of a first pour sequence according to an embodiment of the present invention.
Figure 4:
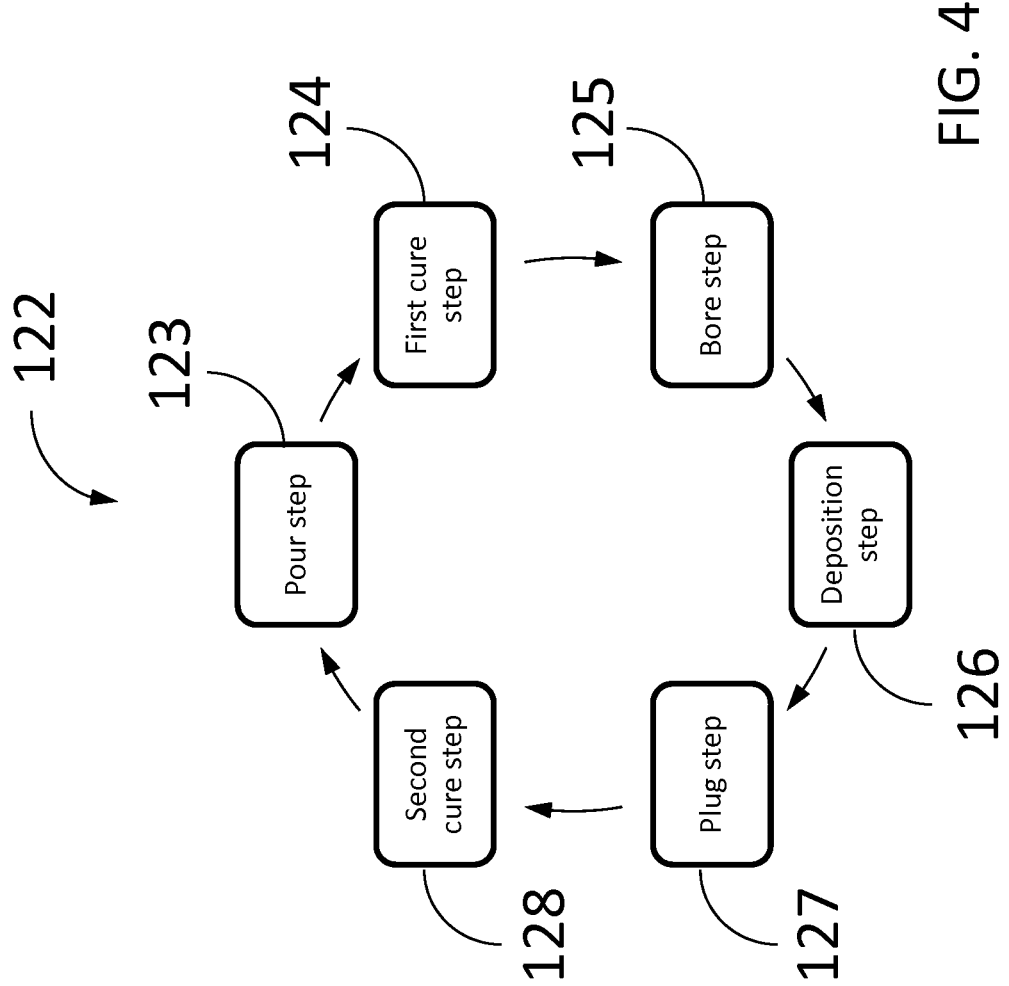
FIG. 4 illustrates a flow chart of detailed steps of a second pour sequence according to an embodiment of the present invention.

The first pour sequence 112 and the second pour sequence 122 both include a plurality of steps, as illustrated in FIGS. 3 and 4. The first pour sequence 112 includes the following steps: a pour step 113, a first cure step 114, a bore step 115, a deposition step 116, a plug step 117, and a second cure step 118. The second pour sequence 122 includes the following steps: a pour step 123, a first cure step 124, a bore step 125, a deposition step 126, a plug step 127, and a second cure step 128.

Any or all steps of the first pour sequence 112 and of the second pour sequence 122 may be performed manually or with the use of automated machinery.

At the pour step 113, a quantity of a thermoset in fluid form is poured into an unfilled portion of the first shaped cavity of the first half-mold. Prior to pouring, the poured quantity of thermoset in fluid form may be degassed within a vacuum chamber by a vacuum degassing process as known by persons of ordinary skill in the art. The poured quantity of the thermoset may vary, but the poured quantity is limited such that after the pour step 113, the sum total quantity of thermoset within the first shaped cavity does not fill the first shaped cavity to the first brim plane. Thus, a portion of the first shaped cavity is filled with a quantity of thermoset, and a remainder of the first shaped cavity remains unfilled.

The thermoset may be a thermosetting resin selected depending on any, some, or all of the following characteristics: refractive index, hardness, brittleness, ultraviolet reactivity, and catalyzation rate.

The thermoset may be selected from among thermosetting resins having a refractive index corresponding to the intended optical clarity of the unitary body to be formed as a product of the process 100. For example, according to embodiments of the present invention where the unitary body is intended to have an optical clarity substantially similar to that of water, the thermoset may be a thermosetting resin having a refractive index substantially similar to that of water, such as polyurethane.

The thermoset may be selected from among thermosetting resins having a hardness sufficient to withstand the application of the curing pressure without deformation.

The thermoset may be selected from among thermosetting resins having a brittleness sufficient to withstand the application of the curing pressure without fracturing.

The thermoset may be selected from among thermosetting resins having an ultraviolet reactivity sufficiently low to resist yellowing, fogging, or surface degradation in response to prolonged ultraviolet radiation exposure.

A thermosetting resin may be produced in different forms having different catalyzation rates, and the catalyzation rate of the selected thermoset may be selected based on the volume of the poured quantity of thermoset. According to embodiments of the present invention, the catalyzation rate of the selected thermoset may be selected according to an inverse relationship to the volume of the poured quantity of thermoset, such that a higher catalyzation rate may be selected for small-volume embodiments of the present invention, and a lower catalyzation rate may be selected for large-volume embodiments of the present invention.

According to embodiments of the present invention, the poured quantity of the thermoset may be limited to fill the lowest cavity division that was not filled with thermoset prior to the pour step 113 within the first shaped cavity, without filling any cavity division above this lowest cavity division.

Next, at the first cure step 114, the poured quantity of the thermoset is cured within the first shaped cavity. The poured quantity of the thermoset is cured by placing the poured quantity of the thermoset at rest within the first half-mold at a curing temperature during a pressurized curing phase and a non-pressurized curing phase. During the pressurized curing phase, the curing pressure is applied to the poured quantity of the thermoset over the span of a first pressurized cure time, such as, for example, by placing the first half-mold within a pressure vessel maintained at the curing pressure. After the first pressurized cure time lapses, during the non-pressurized curing phase, the application of the curing pressure is halted and curing continues over the span of a first non-pressurized cure time. After the first non-pressurized cure time lapses, the poured quantity of the thermoset may harden into solid form. This hardened quantity of the thermoset is added to the sum total of all hardened quantities of the thermoset within the first shaped cavity.

The curing temperature may be selected depending on the thermal expansion coefficients of the thermoset, of the first set of objects, and of the second set of objects, and depending on ambient temperatures during the first pour sequence 112 or during the second pour sequence 122. According to embodiments of the present invention, if the thermal expansion coefficient of the thermoset and the thermal expansion coefficient of an object of the first set of objects are substantially different, or if the thermal expansion coefficient of the thermoset and the thermal expansion coefficient of the second set of objects are substantially different, then the curing temperature may be substantially similar to ambient temperatures during the first pour sequence 112 outside of the first cure step 114 and the second cure step 118 or ambient temperatures during the second pour sequence 122 outside of the first cure step 124 and the second cure step 128. Heating or cooling the thermoset and the first set of objects or the thermoset and the second set of objects during the first cure step 114, the second cure step 118, the first cure step 124, or the second cure step 128 may cause the release of bonds between the thermoset and the first set of objects, or the release of bonds between the thermoset and the second set of objects, thereby leaving spaces between the thermoset and the first set of objects, or spaces between the thermoset and the second set of objects.

The selection of a curing temperature substantially similar to ambient temperatures may minimize the heating or cooling of the thermoset, the first set of objects, and the second set of objects during the first pour sequence 112, and thereby minimize the expansion or contraction of the thermoset and the first set of objects at different rates during the first pour sequence 112, or minimize the expansion or contraction of the thermoset and the second set of objects at different rates during the second pour sequence 122. For example, if ambient temperatures during the first pour sequence 112 outside of the first cure step 114 and the second cure step 118 are approximately room temperature, then the curing temperature may also be approximately room temperature. Throughout all steps of the process 100 according to an embodiment of the present invention, the curing temperature has a substantially constant value wherever a step refers to "the curing temperature."

After the first cure step 114, the sum total of all hardened quantities of the thermoset within the first shaped cavity forms a solid body within the first shaped cavity. The solid body within the first shaped cavity has an exposed surface, where the exposed surface is defined by the upward faces of the solid body that are accessible through the first brim while the solid body rests within the first shaped cavity. The exposed surface does not reach the first brim plane; the space between the exposed surface and the first brim plane defines an unfilled remainder of the first shaped cavity.

According to embodiments of the present invention, the solid body within the first shaped cavity is optically clear and has a refractive index substantially similar to that of water. This may be accomplished by selecting a thermoset which, when cured, has a refractive index substantially similar to that of water, such as polyurethane. According to further embodiments of the present invention, the solid body within the first shaped cavity may have a refractive index substantially similar to that of glass.

Next, at the bore step 115, pits are bored into the solid body within the first shaped cavity. The pits are bored using cutting instruments suitable for creating substantially cylindrical holes, such as a rotary cutting tool. Each of the pits is bored through the exposed face of the solid body within the first shaped cavity. Each pit bored during step 115 within the first shaped cavity corresponds to a deposition site of the first plurality of deposition sites within the first shaped cavity as follows: the position of the bottom of that pit corresponds to the location of that deposition site within the first shaped cavity, and the bottom of that pit contains the entire space occupied by that deposition site. A cutting instrument used to form a pit has a diameter sufficient to form a pit at least as wide as the deposition site to which the pit corresponds. A plurality of cutting instruments having different diameters may be used to bore pits during the bore step 115 in accordance with variations in space occupied by different deposition sites of the first plurality of deposition sites.

According to embodiments of the present invention, a substantially planar surface is not formed at the bottom of any of the pits bored during the bore step 115. This may be accomplished by, for example, selecting cutting instruments where the burr of each cutting instrument is substantially rounded and not substantially conical, such that a substantially rounded surface is formed at the bottom of each pit bored during the bore step 115. For example, the bottom of a pit bored during the bore step 115 may be hemispherical.

Next, at the deposition step 116, for each pit bored into the solid body within the first shaped cavity, an object is deposited into the deposition site to which that pit corresponds, where the deposited object is the object of the first set of objects to which that deposition site corresponds. The deposited object for each pit rests at the bottom of that pit. According to embodiments of the present invention, for each pit, the bottom of the pit has no substantially planar surface, while the deposited object for that pit may have at least one substantially planar face. If so, because the bottom of the pit has no substantially planar surface, no substantially planar face of the deposited object for that pit coheres to any surface at the bottom of the pit while the deposited object rests at the bottom of that pit. Furthermore, if the bottom of the pit has no substantially planar surface, the orientation of a deposited object within that pit may be manually positioned while avoiding geometric placement constraints which may be caused by substantially planar surfaces at the bottom of the pit.

According to embodiments of the present invention, the refractive index of the solid body within the first shaped cavity is lower than each of the refractive indexes of each object of the first set of objects. According to embodiments of the present invention, the first shaped cavity has faceted cavity walls, and each object of the first set of objects has faceted faces. For example, an object of the first set of objects may be a cut gem.

The placement of an object within a pit bored into the solid body within the first shaped cavity may be positioned to align the faceted faces of the object with the faceted cavity walls of the first shaped cavity, in accordance with known principles of light refraction determining the aesthetic appearance of the object when light passes through both the solid body and the object. For example, each deposited object may have at least one faceted face such that each of those faceted faces is oriented in the same direction. Alternately, each deposited object may have at least one faceted face such that each of those faceted faces is oriented outwards towards the cavity walls of the first shaped cavity. Alternately, the placement of an object within a pit bored into the solid body within the first shaped cavity may be positioned randomly.

Next, at the plug step 117, each pit bored into the solid body within the first shaped cavity is plugged by introducing a plugging quantity of the thermoset in fluid form into that pit. The plugging quantities of thermoset in fluid form may first be degassed within a vacuum chamber by a vacuum degassing process as known by persons of ordinary skill in the art. For each pit bored into the solid body within the first shaped cavity, the plugging quantity of the thermoset is sufficient to substantially plug that pit up to the mouth of that pit. For each pit bored into the solid body within the first shaped cavity, the deposited object resting at the bottom of that pit may be entirely submerged within the plugging quantity of the thermoset within that pit. According to embodiments of the present invention, because no substantially planar face of the deposited object in any pit coheres to any surface at the bottom of that pit, each deposited object may be fully surrounded by the plugging quantity of the thermoset within that pit, without obstruction by any surface at the bottom of that pit. According to embodiments of the present invention, each plugging quantity of the thermoset is injected into each pit bored into the solid body within the first shaped cavity through a fine injection apparatus allowing each plugging quantity of the thermoset to be deposited directly into spaces between faces of each deposited object and surfaces at the bottom of each pit. A fine injection apparatus according to embodiments of the present invention may be a hollow needle.

Next, at the second cure step 118, the plugging quantities of the thermoset are cured within each pit bored into the solid body within the first shaped cavity. The plugging quantities of the thermoset are cured by placing the plugging quantities of thermoset at rest within the first half-mold at the curing temperature during a pressurized curing phase and a non-pressurized curing phase. During the pressurized curing phase, the curing pressure is applied to the plugging quantities of the thermoset over the span of a second pressurized cure time, such as, for example, by placing the first half-mold within a pressure vessel maintained at the curing pressure. After the second pressurized cure time lapses, during the non-pressurized curing phase, the application of the curing pressure is halted and curing continues over the span of a first non-pressurized cure time. After the second non-pressurized cure time lapses, the plugging quantities of the thermoset may harden into solid forms plugging each pit drilled into the solid body of the first shaped cavity. These hardened quantities of the thermoset are added to the sum total of all hardened quantities of the thermoset within the first shaped cavity.

The effect of performing the second cure step 118 at the curing temperature, where the curing temperature is approximately room temperature, may be such that the thermoset and the first set of objects do not substantially change in volume during or following the second cure step 118. Consequently, surface bonds between each object of the first set of objects and the thermoset surrounding each object may be maintained without release.

After the second cure step 118, the sum total of all hardened quantities of the thermoset within the first shaped cavity forms a solid body within the first shaped cavity. The solid body within the first shaped cavity has an exposed surface, where the exposed surface is defined by the upward faces of the solid body that are accessible through the first brim while the solid body rests within the first shaped cavity. The exposed surface does not reach the first brim plane; the space between the exposed surface and the first brim plane defines the unfilled remainder of the first shaped cavity.

The steps of the first pour sequence 112 are performed at least once, and may be performed more than once. According to embodiments of the present invention, the steps of the first pour sequence 112 are performed once for each fill plane defined through the first shaped cavity, where, iterating across each performance of the first pour sequence 112, during the first pour step 113 the first shaped cavity is first filled to the bottommost fill plane, and subsequently filled to each next higher fill plane. Thus, for each performance of the first pour sequence 112, a solid body is formed within the first shaped cavity, the solid body having an exposed surface substantially conforming to the bottommost fill plane and having at least one object of the first set of objects embedded therein during an initial performance of the first pour sequence 112, and substantially conforming to each next higher fill plane and having at least one additional object of the first set of objects embedded therein during each subsequent performance of the first pour sequence 112. Thus, an additional layer is added to the solid bodies formed following each performance of the first pour sequence 112, growing each solid body progressively larger in size and volume. After the final performance of the first pour sequence 112 is completed, a solid body is formed within the first shaped cavity having an exposed surface substantially conforming to the top fill plane, having all objects of the first set of objects embedded within the solid body. According to embodiments of the present invention, at least two objects of the first set of objects are embedded within the solid body in vertical alignment with respect to the depth of the first shaped cavity.

Regardless of the number of times the steps of the first pour sequence 112 are performed, after each performance of the first pour sequence 112 is completed, an unfilled remainder remains within the first shaped cavity. According to embodiments of the present invention, after each performance of the first pour sequence 112 is completed, the unfilled remainder within the first shaped cavity is defined by the void between the topmost fill plane and the first fill brim.

According to embodiments of the present invention, throughout each step of the first pour sequence 112, and, furthermore, across each performance of the first pour sequence 112, none of the hardened quantities of the thermoset within the first shaped cavity are removed from the first shaped cavity.

The second pour sequence 122 is performed similarly to the first pour sequence 112, except that the steps of the second pour sequence 122 are performed with respect to the second half-mold and the second shaped cavity, and the respective elements thereof.

After each performance of the first pour sequence 112 is completed, and each performance of the second pour sequence 122 is completed, the joint mold process 130 is performed. The first half-mold and the second half-mold are closed together, defining a common cavity by uniting the first shaped cavity and the second shaped cavity. Within this common cavity, a joint void is defined by the space between the sum total of all hardened quantities of the thermoset within the first shaped cavity and the sum total of all hardened quantities of the thermoset within the second shaped cavity. The joint void is formed by uniting the unfilled remainder of the first shaped cavity and the unfilled remainder of the second shaped cavity.

A sealing quantity of a thermoset in fluid form is injected into the joint void. Prior to injecting, the sealing quantity of thermoset in fluid form may be degassed within a vacuum chamber by a vacuum degassing process as known by persons of ordinary skill in the art. According to embodiments of the present invention, the sealing quantity of a thermoset may be injected into the joint void through a sprue. The sealing quantity of the thermoset may be sufficient to fully fill both the joint void and the sprue.

A fine injection apparatus having sufficient length to reach the bottom of the joint void may be used to inject the sealing quantity of a thermoset by inserting the fine injection apparatus into the common cavity through the sprue. The fine injection apparatus may have a tip which is placed at the bottom of the joint void while the sealing quantity of a thermoset is injected. The sealing quantity of a thermoset may be injected through the tip, thereby filling the joint void from the bottom of the joint void to the top of the joint void, such that air is displaced out of the joint void while the sealing quantity of a thermoset is injected. The fine injection apparatus may be extracted from the common cavity before the joint void and the sprue are fully filled while still injecting the sealing quantity of a thermoset, such that the fine injection apparatus is first extracted from the common cavity before the joint void and the sprue are fully filled.

The sealing quantity of the thermoset is cured within the closed two-part mold. Curing the sealing quantity of the thermoset is performed at the curing temperature, and is performed under the application of the curing pressure during the span of a third cure time, such as, for example, by curing the sealing quantity of the thermoset while the closed two-part mold is within a pressure vessel maintained at the curing pressure. The application of the curing pressure may be halted partway through the span of the third cure time by, for example, removing the joined first half-mold and second half-mold from the pressure vessel. After the third cure time lapses, the sealing quantity of the thermoset may harden into solid form. This hardened sealing quantity of the thermoset is added to the sum total of all hardened quantities of the thermoset within the first shaped cavity and the second shaped cavity, and integrally joins the sum totals of all hardened quantities of the thermoset within the first shaped cavity and within the second shaped cavity forms a unitary body. The unitary body is then removed from the two-part mold.

The unitary body may be substantially uniformly composed of hardened quantities of the thermoset joined integrally throughout the unitary body, providing a substantially uniform optical clarity and a substantially uniform refractive index throughout the unitary body. All objects of the first set of objects and all objects of the second set of objects are embedded within the unitary body. The curing of the sealing quantity of the thermoset may form residual sprue marks or parting lines on the exterior of the unitary body. Sprue marks or parting lines may be removed from the unitary body in accordance with methods known to persons of ordinary skill in the art. According to embodiments of the present invention, jewelry finishing processes as known to persons of ordinary skill in the art, such as the application of additional layers of materials to the exterior of the unitary body, are not performed.

According to embodiments of the present invention, the first pressurized cure time, the second pressurized cure time, and the third pressurized cure time each does not exceed a span of approximately twelve hours. According to embodiments of the present invention, the first non-pressurized cure time, the second non-pressurized cure time, and the third non-pressurized cure time each does not exceed a span of approximately forty-eight hours.

FIGS. 5A through 11 illustrate perspective views of a first half-mold and a second half-mold of a two-part mold during the various steps of a first pour sequence 112 and of a second pour sequence 122, and during a joint mold process 130, according to various small-volume embodiments of the present invention.

FIGS. 5A and 5B illustrate perspective views of a first half-mold 210 and a second half-mold 220 of a two-part mold 200 at the start of different performances of a pour sequence 112, according to an embodiment of the present invention. The first half-mold 210 is illustrated resting in an upright position, having a first shaped cavity 211, a first brim 212, a first mold face 213, and a first sprue channel 214. The second half-mold 220 is illustrated resting in an upright position, having a second shaped cavity 221, a second brim 222, a second mold face 223, and a second sprue channel 224. FIG. 5A illustrates an earlier performance of a pour sequence 112, wherein the first shaped cavity 211 and the second shaped cavity 221 are both empty. FIG. 5B illustrates a later performance of a pour sequence 112, wherein already-formed solid bodies having objects embedded therein is present in both the first shaped cavity and the second shaped cavity.

FIGS. 6A and 6B illustrate perspective views of the first half-mold 210 and the second half-mold 220 of FIG. 5 during different performances of a pour step 113 and a pour step 123, respectively, according to an embodiment of the present invention. The pour step 113 and the pour step 123 may or may not occur at the same time. A quantity of a thermoset in fluid form 230 is illustrated being poured into the first shaped cavity 211. Another quantity of the thermoset in fluid form 240 is illustrated being poured into the second shaped cavity 221. FIG. 6A illustrates earlier performances of pour steps 113 and 123. FIG. 5B illustrates later performances of pour steps 113 and 123, wherein the quantities of the thermoset in fluid form 230 and 240 are poured on top of the already-formed solid bodies in the first shaped cavity and the second shaped cavity.

FIGS. 7A and 7B illustrate perspective views of the first half-mold 210 and the second half-mold 220 of FIG. 5 during different performances of a bore step 115 and a bore step 125, respectively, according to an embodiment of the present invention. The bore step 115 and the bore step 125 may or may not occur at the same time. The quantity of a thermoset in fluid form 230 has hardened to form a solid body 231 having an exposed surface 232 within the first shaped cavity 211, following performance of the first cure step 114. The quantity of a thermoset in fluid form 240 has hardened to form a solid body 241 having an exposed surface 242 within the second shaped cavity 221, following performance of the first cure step 124. A cutting instrument 250 is illustrated boring a pit among a plurality of pits 233 that have been bored into the solid body 231 through the exposed surface 232. A cutting instrument 260 is illustrated boring a pit among a plurality of pits 243 that have been bored into the solid body 241 through the exposed surface 242. The cutting instrument 250 and the cutting instrument 260 are both illustrated having rounded burrs. The cutting instrument 250 and the cutting instrument 260 may or may not be the same cutting instrument, and may or may not have substantially similar diameters. Other pits of the plurality of pits 233 and the plurality of pits 243 may be bored using other cutting instruments not illustrated. FIG. 7A illustrates earlier performances of bore steps 115 and 125. FIG. 7B illustrates later performances of bore steps 115 and 125. The exposed surfaces 232 and 242 are lower in depth within, respectively, the first shaped cavity 211 and the second shaped cavity 221 during the earlier performance than during the later performance.

FIGS. 8A and 8B illustrates perspective views of the first half-mold 210 and the second half-mold 220 of FIG. 5 subsequent to different performances of a deposition step 116 and a deposition step 126, respectively, according to an embodiment of the present invention. The deposition step 116 and the deposition step 126 may or may not occur at the same time. Objects 270 of the first set of objects have been deposited into each of the plurality of pits 233. Objects 280 of the second set of objects have been deposited into each of the plurality of pits 243. FIG. 8A illustrates earlier performances of deposition steps 116 and 126. FIG. 8B illustrates later performances of deposition steps 116 and 126.

FIGS. 9A and 9B illustrate perspective views of the first half-mold 210 and the second half-mold 220 of FIG. 5 during different performances of a plug step 117 and a plug step 127, respectively, according to an embodiment of the present invention. The plug step 117 and the plug step 127 may or may not occur at the same time. A plugging quantity of a thermoset in fluid form 234 is illustrated being introduced into a pit among a plurality of pits 233, and may be introduced using a fine injection apparatus. A plugging quantity of a thermoset in fluid form 244 is illustrated being introduced into a pit among a plurality of pits 243, and may be introduced using a fine injection apparatus. FIG. 9A illustrates earlier performances of plug steps 117 and 127. FIG. 8B illustrates later performances of plug steps 117 and 127.

FIG. 10 illustrates perspective views of the first half-mold 210 and the second half-mold 220 of FIG. 5 closed together during a joint mold step 130 according to an embodiment of the present invention. A sealing quantity of a thermoset in fluid form 290 is illustrated being introduced into a joint void within the common cavity (not illustrated) through a sprue formed by the union of the first sprue channel 214 and the second sprue channel 224.

FIG. 11 illustrates an elevation view of a unitary body 300 formed after a joint mold step 130 according to an embodiment of the present invention. The unitary body has been mounted to a jewelry setting, here illustrated as a looped jewelry setting. The unitary body may alternately be mounted to other jewelry settings such as rings or earring studs, or may be attached to connectors such as bails or chains.

FIGS. 13 through 17 illustrate perspective views of a first half-mold and a second half-mold of a two-part mold during the various steps of a first pour sequence 112 and of a second pour sequence 122, and during a joint mold process 130, according to various large-volume embodiments of the present invention.

FIG. 13 illustrates overhead perspective views of a first half-mold 210 and a second half-mold 220 of a two-part mold 200 at the start of a pour sequence 112, according to a large-volume embodiment of the present invention. The first half-mold 210 is illustrated resting in an upright position, having a first shaped cavity 211, a first brim 212, a first mold face 213, and a first sprue channel 214. The second half-mold 220 is illustrated resting in an upright position, having a second shaped cavity 221, a second brim 222, a second mold face 223, and a second sprue channel 224. FIG. 12 illustrates an initial performance of a first pour sequence 112 and second pour sequence 122, wherein the first shaped cavity 211 and the second shaped cavity 221 are both empty. According to an embodiment of the present invention, the first shaped cavity 211 and the second shaped cavity 221 may conform to the geometric form of a full-sized guitar, having dimensions of approximately 19 inches in length, 12 inches in width, and 2 inches in thickness, and the first sprue channel 214 and the second sprue channel 224 may each have a width of approximately three quarters of an inch.

Figure 14:
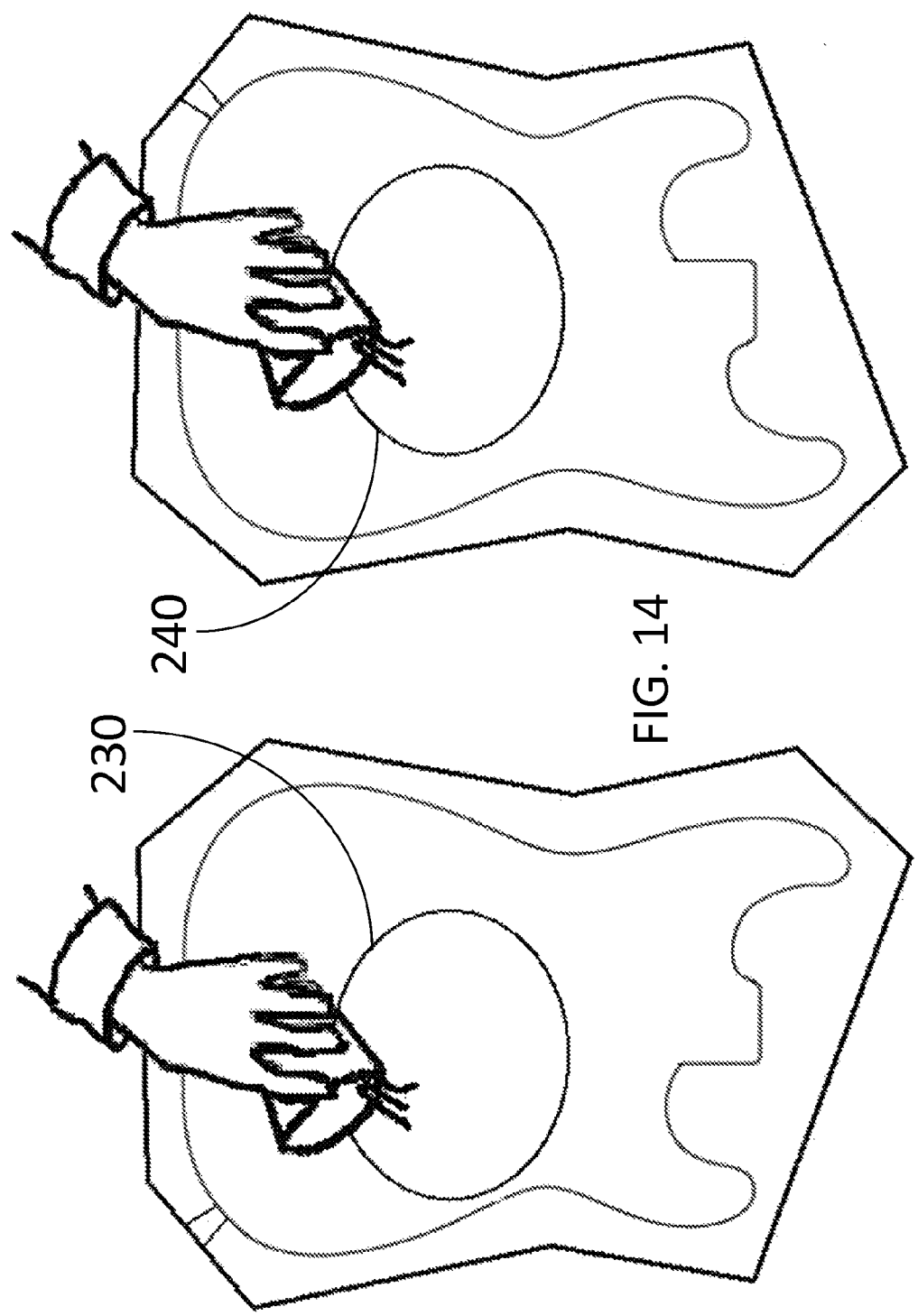
FIG. 14 illustrates perspective views of the first half-mold and the second half-mold of FIG. 12 during performances of pour steps according to a large-volume embodiment of the present invention.

FIG. 14 illustrates overhead perspective views of the first half-mold 210 and the second half-mold 220 of FIG. 12 during performances of a pour step 113 and a pour step 123, respectively, according to a large-volume embodiment of the present invention. The pour step 113 and the pour step 123 may or may not occur at the same time. A quantity of a thermoset in fluid form 230 is illustrated being poured into the first shaped cavity 211. Another quantity of the thermoset in fluid form 240 is illustrated being poured into the second shaped cavity 221. According to an embodiment of the present invention, quantities of a thermoset in fluid form may have a volume of approximately one quart or more.

FIG. 15 illustrates overhead perspective views of the first half-mold 210 and the second half-mold 220 of FIG. 12 subsequent to performances of a deposition step 116 and a deposition step 126, respectively, according to a large-volume embodiment of the present invention. The deposition step 116 and the deposition step 126 may or may not occur at the same time. Objects 270 of the first set of objects have been deposited into each of the plurality of pits 233. Objects 280 of the second set of objects have been deposited into each of the plurality of pits 243. According to an embodiment of the present invention, the first set of objects and the second set of objects in total may include approximately one hundred or more objects.

FIG. 16 illustrates overhead perspective views of the first half-mold 210 and the second half-mold 220 of FIG. 12 during performances of a plug step 117 and a plug step 127, respectively, according to a large-volume embodiment of the present invention. The plug step 117 and the plug step 127 may or may not occur at the same time. A plugging quantity of a thermoset in fluid form 234 is illustrated being introduced into a pit among a plurality of pits 233, and may be introduced using a fine injection apparatus. A plugging quantity of a thermoset in fluid form 244 is illustrated being introduced into a pit among a plurality of pits 243, and may be introduced using a fine injection apparatus.

FIG. 17 illustrates a cross sectional view of the first half-mold 210 and the second half-mold 220 of FIG. 5 closed together during a joint mold step 130 through the seam plane where the first mold face and the second mold face are closed together, according to a large-volume embodiment of the present invention. A sealing quantity of a thermoset in fluid form 290 is illustrated being introduced into a joint void within the common cavity through a sprue formed by the union of the first sprue channel 214 and the second sprue channel 224. According to an embodiment of the current invention, a fluid conveyance apparatus having sufficient length to reach the bottom of the joint void is inserted into the common cavity through the sprue, and the thermoset is introduced into the joint void within the common cavity through the fluid conveyance apparatus. The fluid conveyance apparatus may be a tubing apparatus.

According to embodiments of the present invention as illustrated in FIGS. 13 through 17, the first pour sequence 112 or the second pour sequence 122 may be performed four times, wherein, during a first performance, the steps of the first pour sequence 112 or the steps of the second pour sequence 122 are performed with reference to the bottom fill plane 320; during a second performance, the steps of the first pour sequence 112 or the steps of the second pour sequence 122 are performed with reference to the lower midsection fill plane 340; during a third performance, the steps of the first pour sequence 112 or the steps of the second pour sequence 122 are performed with reference to the upper midsection fill plane 360; and during a fourth performance, the steps of the first pour sequence 112 or the steps of the second pour sequence 122 are performed with reference to the top fill plane 380.

Embodiments of the present invention combine an open-face molding process and an injection molding process to embed decorative articles within a shaped unitary body. The open-face molding process, performed in iterations wherein objects are embedded in each half of the shaped body in layers, may allow objects to be set in any designed or random pattern throughout the shaped body. Furthermore, the open-face molding process introduces objects into fluid thermoset within the mold under controlled elevated pressure levels without heating, which may prevent the formation of air bubbles about the embedded objects. Objects are deposited at the bottom of pits not having planar surfaces, which may allow objects to be fully submerged within fluid thermoset plugging each pit without leaving residual air pockets about the embedded objects. The same thermoset may be used throughout the overall process, thus forming a unitary body product having a seamless, optically clear appearance.

What is claimed is:

1. A process comprising:

forming, under application of a curing pressure, a first half-mold having a first shaped cavity, wherein the first shaped cavity has a first brim;

performing the following steps (i)-(vi) at least once:

(i) pouring a quantity of a thermoset in fluid form into the first shaped cavity such that an unfilled remainder remains within the first shaped cavity;

(ii) curing the quantity of the thermoset in fluid form within the first shaped cavity under application of the curing pressure, such that the quantity of the thermoset in fluid form within the first shaped cavity forms a solid body within the first shaped cavity having an exposed surface not reaching the first brim of the first shaped cavity;

(iii) boring a plurality of pits, each having a bottom, into the solid body within the first shaped cavity through the exposed surface of the solid body within the first shaped cavity, without forming a substantially planar surface at the bottom of any of the pits of the plurality of pits of the solid body within the first shaped cavity;

(iv) placing an object into each pit of the plurality of pits of the solid body within the first shaped cavity;

(v) filling each pit of the plurality of pits of the solid body within the first shaped cavity with a plugging quantity of the thermoset in fluid form, such that each object within each pit of the plurality of pits of the solid body within the first shaped cavity is submerged within each plugging quantity of the thermoset in fluid form; and (vi) curing each plugging quantity of the thermoset in fluid form in the body within the first shaped cavity under application of the curing pressure;

forming, under application of the curing pressure, a second half-mold having a second shaped cavity, wherein the second shaped cavity has a second brim;

performing the following steps (vii)-(xii) at least once:

(vii) pouring a quantity of a thermoset in fluid form into the second shaped cavity such that an unfilled remainder remains within the second shaped cavity;

(viii) curing the quantity of the thermoset in fluid form within the second shaped cavity under application of the curing pressure, such that the quantity of the thermoset in fluid form within the second shaped cavity forms a solid body within the second shaped cavity having an exposed surface not reaching the second brim of the second shaped cavity;

(ix) boring a plurality of pits, each having a bottom, into the solid body within the second shaped cavity through the exposed surface of the solid body within the second shaped cavity, without forming a substantially planar surface at the bottom of any of the pits of the plurality of pits of the solid body within the second shaped cavity;

(x) placing an object into each pit of the plurality of pits of the solid body within the second shaped cavity;

(xi) filling each pit of the plurality of pits of the solid body within the second shaped cavity with a second plugging quantity of the thermoset in fluid form, such that each object within each pit of the plurality of pits of the solid body within the second shaped cavity is submerged within each second plugging quantity of the thermoset in fluid form; and (xii) curing each plugging quantity of the thermoset in fluid form in the body within the second shaped cavity under application of the curing pressure; closing the first half-mold and the second half-mold together such that the first shaped cavity and the second shaped cavity are united to form a common cavity enclosed by the first half-mold and the second half-mold, and the unfilled remainder of the first shaped cavity and the unfilled remainder of the second shaped cavity are united to form a joint void within the common cavity;

filling the entirety of the joint void with a sealing quantity of the thermoset in fluid form; and curing the sealing quantity of the thermoset in fluid form within the common cavity while the first half-mold and the second half-mold are closed together under application of a curing pressure, such that the sum total of cured thermoset in fluid form within the first half-mold and within the second half-mold forms a unitary body.

2. The process of claim 1:

wherein the exposed surface of the solid body within the first shaped cavity is substantially level; and wherein the exposed surface of the solid body within the second shaped cavity is substantially level.

3. The process of claim 2:

wherein the depth of at least two pits of the plurality of pits of the solid body within the first shaped cavity are different; and wherein the depth of at least two pits of the plurality of pits of the solid body within the second shaped cavity are different.

4. The process of claim 1, wherein steps (i)-(vi) are performed more than once, and steps (vii)-(xii) are performed more than once.

5. The process of claim 1:

wherein a first object inserted into a pit of the plurality of pits of the solid body within the first shaped cavity during a performance of step (iv) and a second object inserted into a pit of the plurality of pits of the solid body within the first shaped cavity during a subsequent performance of step (iv) are vertically aligned; and wherein a third object inserted into a pit of the plurality of pits of the body within the second shaped cavity during a performance of step (x) and a fourth object inserted into a pit of the plurality of pits of the body within the second shaped cavity during a subsequent performance of step (x) are vertically aligned.

* * * * *